United States Patent [19]

Craig et al.

[11] 3,992,244

[45] Nov. 16, 1976

[54] TAPE APPLICATING AND SEVERING ASSEMBLY

[75] Inventors: Alan J. Craig, Oakdale; James H. Casey, Roseville; Richard P. de Neui, Lake Elmo, all of Minn.

[73] Assignee: Minnesota Mining & Manufacturing Company, St. Paul, Minn.

[22] Filed: June 4, 1975

[21] Appl. No.: 583,772

[52] U.S. Cl. ................................ 156/521; 156/541; 156/584

[51] Int. Cl.² ........................................ B32B 31/00

[58] Field of Search ........... 156/521, 517, 540, 541, 156/542, 584, 248, 249, 519; 428/40–42, 352

[56] References Cited

UNITED STATES PATENTS 3,625,801 12/1971 Reed et al. ...................... 156/521 X

*Primary Examiner*—William A. Powell
*Assistant Examiner*—M. G. Wityshyn
*Attorney, Agent, or Firm*—Alexander, Sell, Steldt & DeLaHunt

[57] ABSTRACT

An apparatus for applying severed strips of double-coated adhesive tape to a substrate from the face of a carrier liner. A length of tape having adhesive on both sides and disposed on a release liner is fed continuously past a severing means which cuts the tape into strips but does not sever the liner. The tape strips are then carried by the liner to an applicating member where the strips of tape are applied to a moving substrate.

10 Claims, 7 Drawing Figures

TAPE APPLICATING AND SEVERING ASSEMBLY

BACKGROUND OF THE INVENTION

1. Field of the Invention

This invention relates to machines for applying double-coated pressure-sensitive adhesive tape strips.

2. Prior Art

U.S. Pat. No. 3,472,724 issued Oct. 14, 1969 to J. H. Casey discloses an apparatus which is suitable for feeding a length of tape to an applying pad, across a severing member, which will sever and apply the tape to a substrate. This device will apply double-coated pressure-sensitive adhesive tape strips. It is often desirable when applying double-coated tape, especially a double-coated foam tape, that the tape strip after it is applied not have a liner on one surface. In order to apply the tape however it is necessary to contact one surface of the tape. With double coated tape this would require contact with one adhesive surface if the liner were previously removed. In a device as illustrated in the above mentioned patent the pad is supplied with gripping means or a vacuum to hold the cut strips and the liner adhered thereto while the exposed opposite surface of the tape is applied to the receptor surface.

BRIEF SUMMARY OF THE INVENTION

The present invention solves the problems of prior art devices by providing a tape applicating head wherein a release liner carries the double-coated tape to an applicating station and holds the tape in position during application to a substrate. This permits the double-coated tape to be applied without the liner on one surface. The device of the present invention has a frame supporting a convolutely wound roll of double-coated tape disposed on a release liner. The tape is carried to severing means by the release liner where the tape, but not the liner, is cut transversely into strips. The liner carries the severed tape strips to an applicating station where an applicating arm places the strips on the surface of a moving substrate. The applicating arm has an applicating end and a rotating end, the rotating end being mounted on a driven eccentric. The arm has a cam track associated therewith which extends along a portion of the length of said arm. A cam member, mounted on a driven eccentric, engages the cam track at a point between the applicating end and the rotating end of the cam.

Means is provided to move the liner with the tape strips thereon from the severing means to an applicating position at the end of the applicating arm and to move the liner past the applicating position to a disposal station after application of the tape. Indexing means register the cut strips of tape at the end of the applicating arm in position for application to the substrate. As the rotating end and cam member rotate on their eccentrics, the applicating end of said applicating arm is moved in a narrow foil shaped biconvex path when viewed in plan.

BRIEF DESCRIPTION OF THE DRAWINGS

The present invention will be fully understood after reading the following description which refers to the accompanying drawing wherein.

DETAILED DESCRIPTION OF THE PREFERRED EMBODIMENTS

Figures 1, 7:
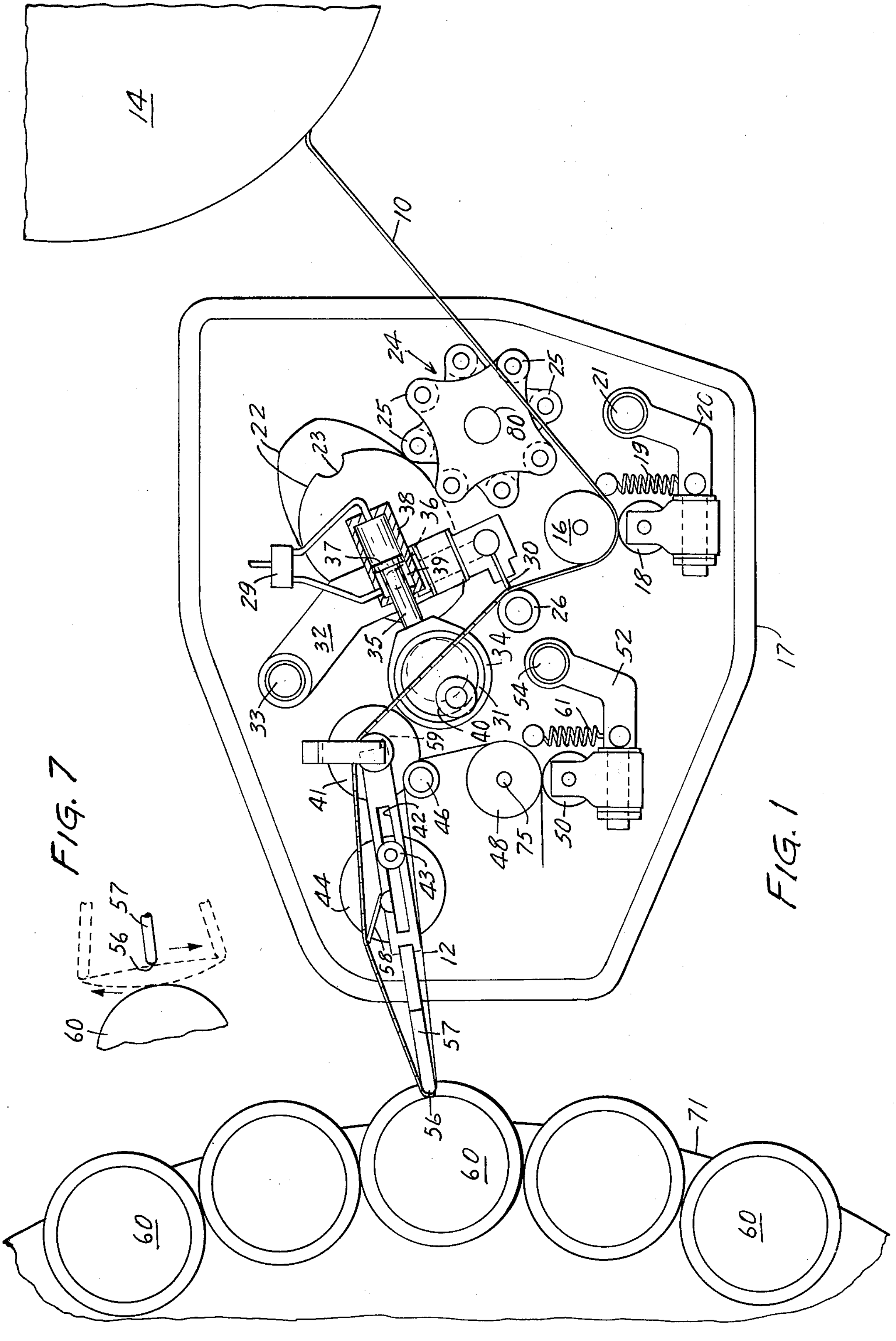
FIG. 1 is a plan view of an applicator constructed according to this invention with the applicating arm in the applying position.
FIG. 7 is a diagrammetric plan view illustrating the path of the tip of the applicating arm.

Referring to the accompanying drawing in which like numerals refer to like parts throughout the several views, one adhesive coated surface of a double-coated pressure-sensitive adhesive tape 10 is in contact with a tape metering roller 16 which draws the tape and associated release liner 12 from a convolutely wound supply roll 14 of tape and liner. The metering roller 16 will be formed of a release material such as silicone rubber. A uniform pressure is maintained between the tape metering roller 16 and tape 10 by means of a pressure roller 18. The roller 18 is mounted on a link 20 pivoted to the frame 17 by a stud 21. The link 20 is urged towards the metering roller 16 by means of a spring 19 to maintain a firm contact between the tape 10 and the tape metering roller 16.

To dispense tape, the tape metering roller 16 is rotated stepwise or is indexed a fractional amount of a revolution stripping tape from the supply roll 14. As shown, the metering roller 16 is intermittently driven by means including a driven shaft 79 rotating a pair of cams 22 which have axially spaced lobes. Each lobe has a depression 23, the depressions being spaced at 180°. As the cam 22 is driven at a constant rate of speed, the depressions 23 make contact with opposed pins 25 in an intermittent drive wheel 24. As shown, there are 8 pins in a star arrangement so that the tape metering roller 16 will be advanced ⅛ revolution each time the intermittent drive wheel is advanced by a cam 22 through a gear train shown in FIG. 6.

After being withdrawn by the tape metering roller 16, the liner and tape pass across a roller 26 which cooperates with severing means. As shown, the severing means comprises a heated elongate thin blade 30 mounted on a pivotable arm 32 which is rotatably mounted on pin 33 attached to the frame 17. The arm 32 and the associated knife 30 are oscillated by eccentric 31 which includes a bushing 34 with rod 35 rigidly attached thereto. The end of this rod 35 opposite said eccentric 31 is in the form of a piston 37 slideably mounted in a housing 38. As the eccentric 31 rotates the piston 37 moves in the housing 38. A chamber 39 formed by the piston 37 and housing 38 nearest the eccentric is normally maintained under a small positive pressure applied by a valve 29 which adjusts the air and therefore the cutting pressure of the blade. As the rod 35 is pulled towards the tape 10 the air in chamber 39 is compressed causing the housing 38 and arm 32 to which it is attached pivotally by a pin 36 to move towards the tape. The heated blade 30 severs the tape and adhesive by rapid brief contact with the tape to sever or melt the adhesive layers and the tape backing which may be a polyethylene foam. As the eccentric 31 continues to rotate the piston 37 moves away from the tape and the piston acting in the chamber opposite chamber 39 causes housing 38 to move arm 32 and blade 30 to a retracted position.

The valve 29 permits compressed air to be directed through one line to the chamber in the housing 38 opposite chamber 39. The build up of pressure causes housing 38 to draw the arm 32 and blade 30 farther away from the cooperating roller 26. This effectively moves the knife away from the tape and is used when the unit is not operating to prevent burning the tape or liner. The valve 29 is designed so that the knife is automatically retracted in this manner whenever the taping head is not operating.

Where the tape 10 to be dispensed has a soft foam backing, such as a polyethylene, the hot blade 30 will melt the foam and adhesive layers but not cut or burn the liner. This forms severed transversely extending strips of tape which remain on the liner. Thus, the liner is used to transport the severed strips of tape to an applicating position. Each strip having a length corresponding to the original width of the tape.

From the cutter, the tape passes a pin 40 extending perpendicular to the planer surface of the frame 17, the pin 40 being rotatable with the eccentric 31. The eccentric 31 moves in such a manner that the distance between the pin 40 and an applicating tip 56 of an applicating member such as arm remains constant thereby insuring that the severed piece of tape to be applied will be at the tip of the applicating arm and that the severed strip of tape will not oscillate back and forth around the tip of the applicating arm 57 as the tip moves in a biconvex or thin foil shaped path the ends of which are cusps as shown in FIG. 7. The pin 40 is mounted on the eccentric 31 about 180° from the axis of the drive shaft which rotates eccentric 31.

The liner 12 with the severed pieces of tape 10 thereon passes across a tape location adjuster 58 which can be adjusted so that the tape strip to be applied is centered at the end of the applicating arm. The liner 12 and tape pieces move across the applicating tip 56 of the applicating arm 57 where the pieces are applied, one at a time as the tip moves through a cycle, to a substrate 60. The applicating tip 56 as shown is an oblong planar surface, or surface conforming to the shape of the strip and profile of the substrate, to support a strip of tape. The substrate shown is a can. The device of this invention is particularly useful in applying strips of a tape comprising of a soft foam backing having adhesive on both sides thereof to beverage cans which can then be assembled into groups, e.g., a "six pack."

The applicating arm 57 has one end 59 mounted for movement on a rotating eccentric wheel 41 which will give the applicating tip 56 and applicating arm 57 an in-and-out motion pushing the applicating tip out from the housing 17 to make contact with the substrate 60 to which a tape strip is to be applied while the applicating tip is moving in the same direction and at the same rate as the moving substrate 60. After application of the tape strip, the tip 56 is pulled in toward the housing so that as the tip moves backwards, to begin another applicating cycle, it will not come in contact with the substrate.

Figure 4:
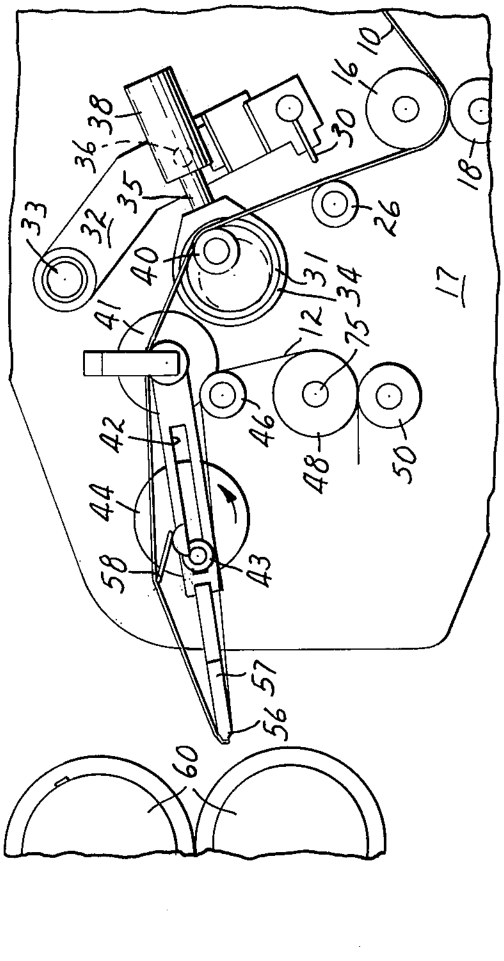
FIG. 4 is a fragmentary plan view illustrating the applicating arm as it returns to start an applicating cycle.

Near the center of the applicating arm 57 is a cam race 42 in which a cam 43 moves. Cam 43 is an eccentric pin mounted on a wheel 44 and gives the applicating arm 57 a sweeping motion. The combination of the motion of the rotating end 59 on eccentric wheel 41 and wheel 44 and pin 43 moves the applicating tip 56 in a long-thin foil shaped path or biconvex path. The applicating arm in an extended position is suitable for applying tape to a moving substrate and in a retracted position returns the applicating end 56 of the arm 57 to the beginning of the cycle without touching the substrate. By use of the proper arm length and eccentric size, the speed of the applicating tip 56 is matched to that of the substrate 60. As shown in FIG. 4, the eccentric pin 43 and axis supporting the end 59 on wheel 41 will be closest together when the tape is being applied to the substrate as shown in FIG. 1. This is also the point of maximum speed for the applicating tip allowing the substrate to move past the applicating head at the maximum possible speed.

After the tape has been applied to the moving substrate 60, the liner 12 will move around a scavenging roller 46 which will pick up any pieces of tape remaining on the liner and the spent liner, cleaned of any residual tape, is pulled by a driven roller 48 to a disposal area. The roller 48 is driven through an adjustable slip clutch.

A constant pressure is applied to roller 48 by means of a pressure roller 50 mounted by a bracket on a shaft which in turn is mounted in a frame 52 which pivots about stud 54 mounted to the frame 17. The tension on roller 50 is supplied by a spring 61. The roller 50 and driven roller 48 hold the liner tightly therebetween maintaining tension on the liner from the metering roller 16 past eccentric pin 40 around the applicating tip 56 and through the rollers 48 and 50. This tension maintains the liner in a straight line as it travels about the rollers and tip through the taping head.

Figure 2:
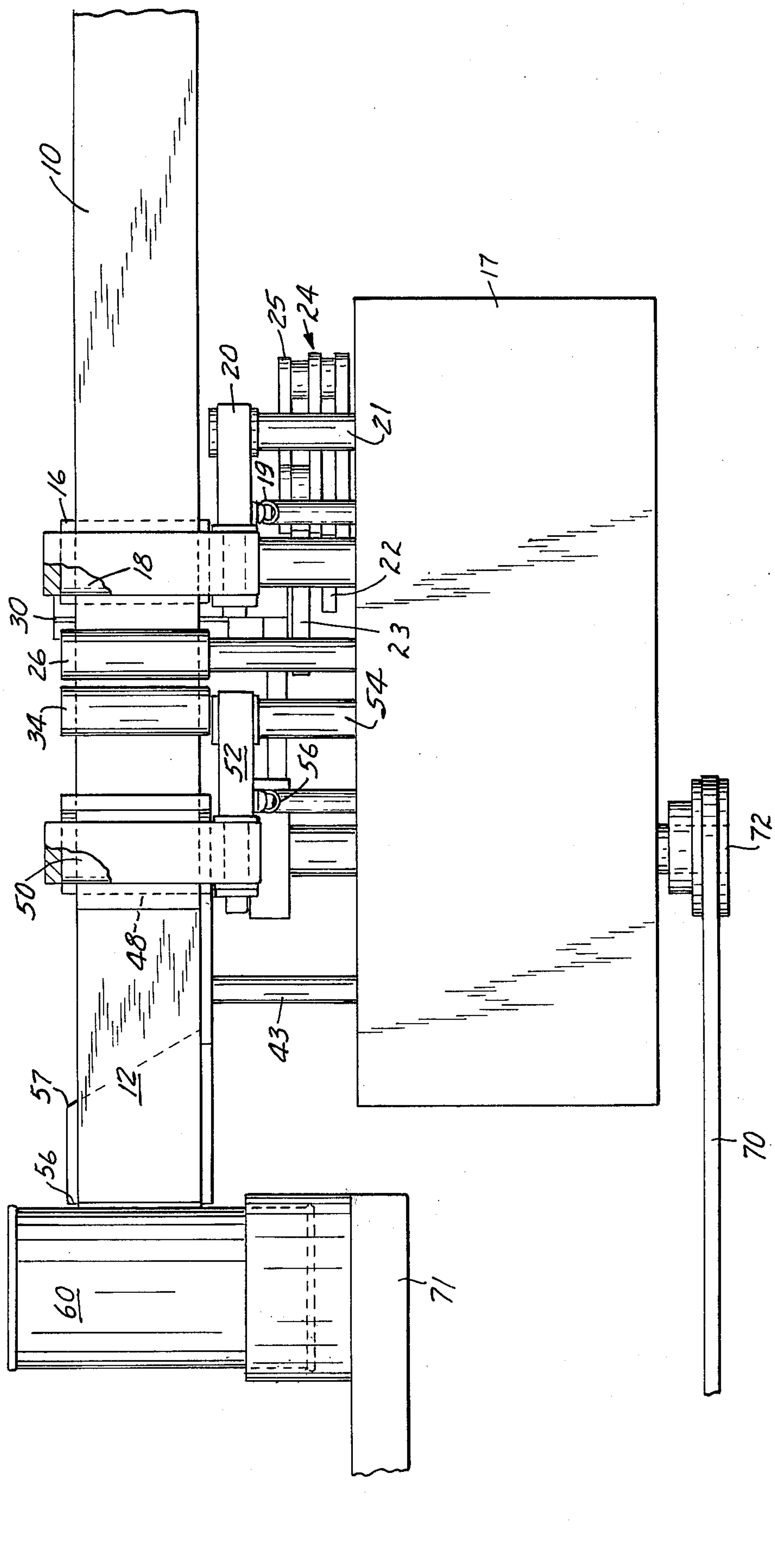
FIG. 2 is an elevational view of the applicator of FIG. 1.
Figure 5:
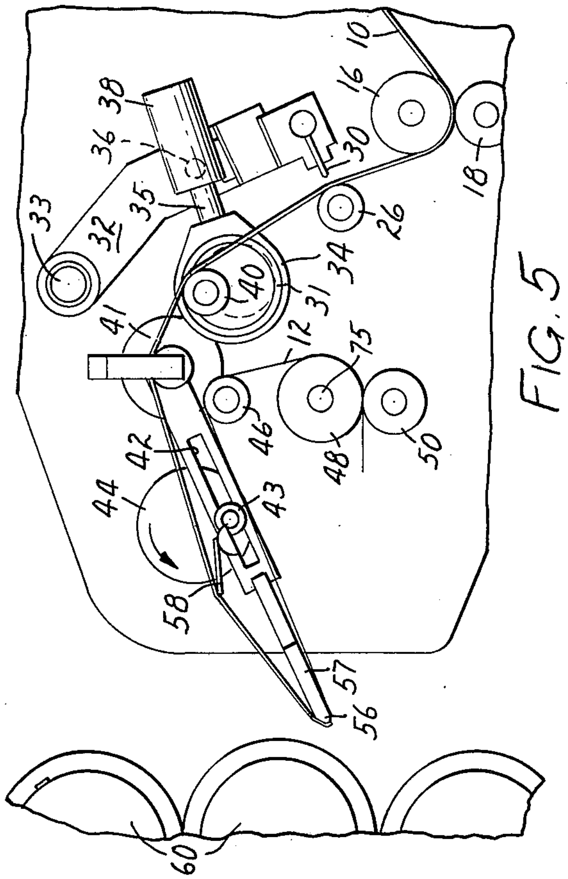
FIG. 5 is a fragmentary plan view illustrating the applicating arm as the arm is starting an applicating cycle.
Figure 6:
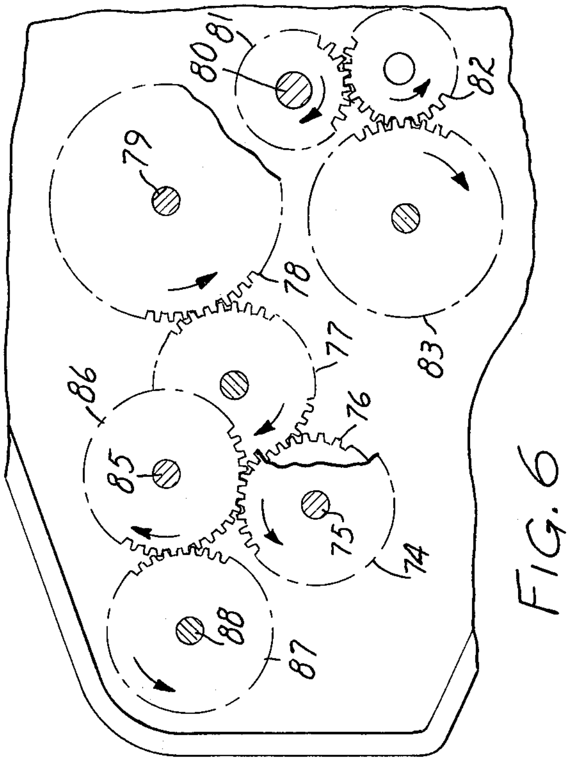
FIG. 6 is a fragmentary sectional view of the applicator illustrating the drive gears.
Figure 3:
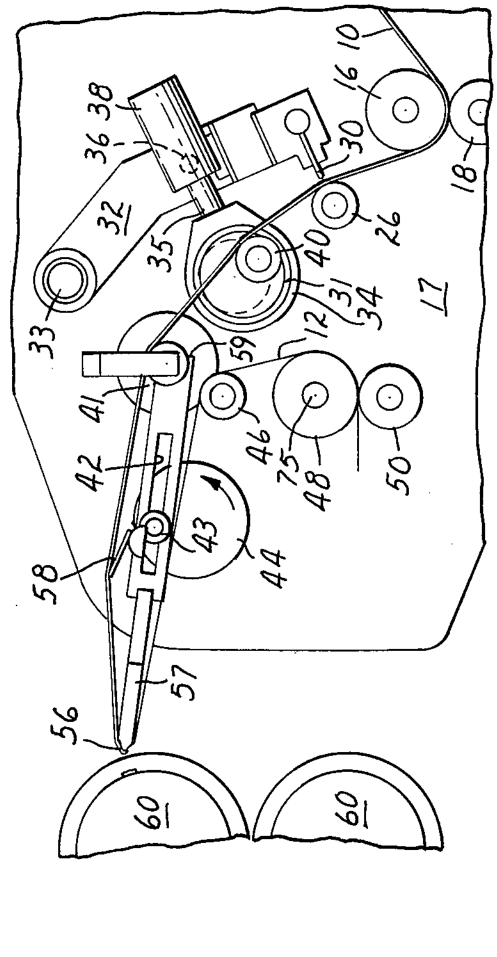
FIG. 3 is a fragmentary plan view illustrating the applicating arm upon completion of an applicating cycle.

The various shafts' driving the eccentrics can be driven by various drive means, such as chains or gears. A gear train is preferred since it is compact and requires the minimum amount of space. The drive for the applicator is illustrated in FIGS. 2 and 6. The drive for the applicator is matched to the movement of the conveying mechanism for the substrate to keep the two pieces in proper timed sequence. This is obtained by a drive belt or chain 70 driven from a drive pulley (not shown) supported on the conveyor frame 71 and rotatable therewith. The belt 70 drives a pulley 72 which drives a shaft 75 in the applicator as shown in FIG. 6. Fixed to shaft 75 is a first gear 76 and a second gear 74 and roller 48 via a slip clutch as above-described. The gear 76 drives a gear 77 which drives the eccentric 31 to control the cutting and tape position and drive therethrough a gear 78 and shaft 79 which drives the cams 22. The cams 22 drive the wheel 24 to incrementally drive a shaft 80, a gear 81, idler 82 and a drive gear 83 for the roller 16. The second gear 77 drives the shaft 85 coupled to the eccentric wheel 41 and gear 86 and a gear 87 driving a shaft 88 coupled to the wheel 44 carrying eccentric pin 43.

The gears illustrated in FIG. 6 are suitably formed to drive the applicating arm along its path so it will apply a strip of tape to the substrate, to index the tape and to operate the tape cutter or slicer. During application the movement of the tip 56 and tape strip match the speed of movement of the substrate to place the strip thereon and transfer it from the liner 12. The arm will then position another strip of tape at the tip and return to the start position to begin another cycle.

Having described the present invention with reference to the preferred embodiment, it is to be understood that changes can be made to the several parts without departing from the spirit of the invention as recited in the appended claims.

What is claimed is:

1. An apparatus for cutting and applying a thin strip of double-coated, pressure-sensitive adhesive tape to a substrate comprising:

a frame;

a means for supporting a supply of convolutely wound double-coated adhesive tape on said frame, said tape being disposed on a release liner;

severing means for cutting said tape across its width to form strips and not sever the liner so said tape strips remain on said liner after cutting;

an applicating arm having an applicating tip and an opposite end, said opposite end being mounted on a driven eccentric rotated on said frame about an axis perpendicular to an axis of said arm extending between said tip and said opposite end for movement of said opposite end about a circular path and said arm longitudinally, said applicating tip having a surface extending parallel to the axis of rotation of said opposite end for supporting a strip of tape;

means associated with said tip applicating arm intermediate said tip and said opposite end for oscillating said applicating arm about said eccentric resulting in said applicating tip moving through a thin-foil shaped biconvex path at a rate momentarily equaling the speed of the substrate;

means for advancing said tape and said liner off a said supply past said severing means and applicating tip of said applicating arm; and indexing means for registering a severed strip of tape at the applicating tip of the applicating arm in position for application to the substrate.

2. The apparatus of claim 1 wherein said severing means is heated blade mounted on an oscillating arm which moves the blade into contact with the tape as it moves past a roller which cooperates with said blade to sever said tape.

3. The apparatus of claim 1 wherein said indexing means comprises a driven tape metering roller which advances the tape in short increments between cuts and an eccentric roller located between said metering roller and said applicating arm, said eccentric roller keeping the severed pieces of tape from oscillating about the applicating tip.

4. The apparatus of claim 1 wherein said means associated with said applicating arm comprises a cam member engaging a cam track extending longitudinally of said applicating arm, said cam member being mounted on a driven eccentric rotated on an axis perpendicular to the longitudinal axis of said arm.

5. The aparatus of claim 1 wherein said severing means comprises a blade extending across the width of the tape, said blade being mounted on a pivotal arm to swing toward and away from a support across which the tape is moved.

6. The apparatus of claim 5 wherein said pivotal arm is moved upon movement of an adjustable link between said pivotal arm and a driving member, said link comprising a piston having a connecting rod and a housing receiving said piston and forming a chamber on each side of said piston, and a valve for adjusting the air pressure on said piston to adjust the cutting pressure, form an air spring and position the blade in relationship to the support when the knife is out of cutting position.

7. The apparatus of claim 1 wherein said indexing means comprises a driven tape metering roller which advances the tape an amount corresponding to the length of the tape between cuts, and a roller supported on a pin between said metering roller and said applicating arm, said pin being positioned eccentric to a driven roller for keeping the severed pieces of tape from oscillating about the applicating tip.

8. An apparatus for cutting and applying a thin strip of double-coated, pressure-sensitive adhesive tape to a substrate comprising:

a frame, a means for supporting a supply of convolutely wound double-coated adhesive tape on said frame, said tape being disposed on a release liner, severing means including a heated blade mounted on an oscillating arm for cutting said tape across its width to form strips, said oscillating arm moves the blade into contact with the tape as it moves past a roller which cooperates with the blade to sever the tape and not sever the liner so said tape strips remain on said liner after cutting, an applicating arm having an applicating tip and an opposite end, said applicating tip having a surface extending perpendicular to the longitudinal axis of said applicating arm for supporting a strip of tape, means supporting said applicating arm for oscillatory movement of said applicating tip about said opposite end to move the tape strips into contact with a moving substrate, means for advancing said tape and said liner off a said supply past said severing means and applicating tip of said applicating arm, and indexing means for registering a severed strip of tape at the applicating tip of the applicating arm in position for application to the substrate.

9. An apparatus according to claim 8 wherein said indexing means comprises a driven tape metering roller which advances the tape in short increments between cuts, an eccentric roller located between said metering roller and said applicating arm, and means driving said eccentic roller for keeping the severed pieces of tape from oscillating about the applicating tip.

10. An apparatus according to claim 10 wherein said means supporting said applicating arm comprises an eccentric wheel rotatable on an axis perpendicular to the longitudinal axis of the applicating arm and connected to said opposite end of said applicating arm to move the applicating arm longitudinally and support means intermediate the applicating tip and said opposite end for oscillating said applicating arm about the connection to said eccentric wheel affording movement of said applicating tip along a biconvex path to apply the tape strips to a moving substrate.

* * * * *